(12) United States Patent
Zbinden et al.

(10) Patent No.: US 6,747,819 B1
(45) Date of Patent: Jun. 8, 2004

(54) OPTOELECTRONIC ASSEMBLY

(75) Inventors: Eric Zbinden, Mountain View, CA (US); Sylvain Colin, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 83 days.

(21) Appl. No.: 10/374,879

(22) Filed: Feb. 25, 2003

(51) Int. Cl.$^7$ .................................................. G02B 7/02
(52) U.S. Cl. ........................ 359/819; 385/90; 385/91; 385/93; 359/824
(58) Field of Search ................................ 359/819, 824, 359/829, 818, 822; 385/90–94, 59, 60, 88, 139, 137, 89, 49; 248/316.4, 664; 250/227.11, 227.24, 227.28, 216; 257/433

(56) References Cited

U.S. PATENT DOCUMENTS

| | | | | |
|---|---|---|---|---|
| 5,495,661 A | * | 3/1996 | Gromer et al. | 29/740 |
| 5,924,290 A | * | 7/1999 | Yoshino | 62/3.7 |
| 6,207,950 B1 | * | 3/2001 | Verdiell | 250/239 |
| 6,227,724 B1 | * | 5/2001 | Verdiell | 385/91 |
| 6,511,236 B1 | * | 1/2003 | Webjorn et al. | 385/91 |
| 6,543,740 B2 | * | 4/2003 | Gaunt et al. | 248/476 |
| 2003/0152355 A1 | | 8/2003 | Verdiell et al. | 385/136 |

* cited by examiner

*Primary Examiner*—Ricky Mack
*Assistant Examiner*—Brandi N Thomas
(74) *Attorney, Agent, or Firm*—Trop, Pruner & Hu, P.C.

(57) ABSTRACT

In one embodiment, an optoelectronics package includes multiple optical elements and multiple flexures, with at least one optical element attached to each flexure. The optical elements may be in alignment with each other.

22 Claims, 4 Drawing Sheets

OPTOELECTRONIC ASSEMBLY

BACKGROUND

The present invention relates generally to optoelectronic assemblies having optical elements and methods for making the same. More particularly, the present invention relates to an assembly having optical elements mounted on a plurality of flexures and methods for making the same.

Sealed packages are used to contain, protect, and couple to optical fibers and electrically connect optoelectronic components. Optoelectronics packaging is one of the most difficult and costly operations in optoelectronics manufacturing. Optoelectronic packages may provide submicron alignment between optical elements, high-speed electrical connections, excellent heat dissipation, and high-reliability.

Providing such features has resulted in optoelectronic packages that are an order of magnitude larger, costlier and more difficult to manufacture than electronic packages, particularly for fiber coupled devices. In addition, current designs of optoelectronic packages and associated fabrication processes are ill adapted for automation because today's high-performance butterfly packages are characterized by a large multiplicity of mechanical parts (such as submounts, brackets, ferrules), three-dimensional alignment requirements, and poor mechanical accessibility.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
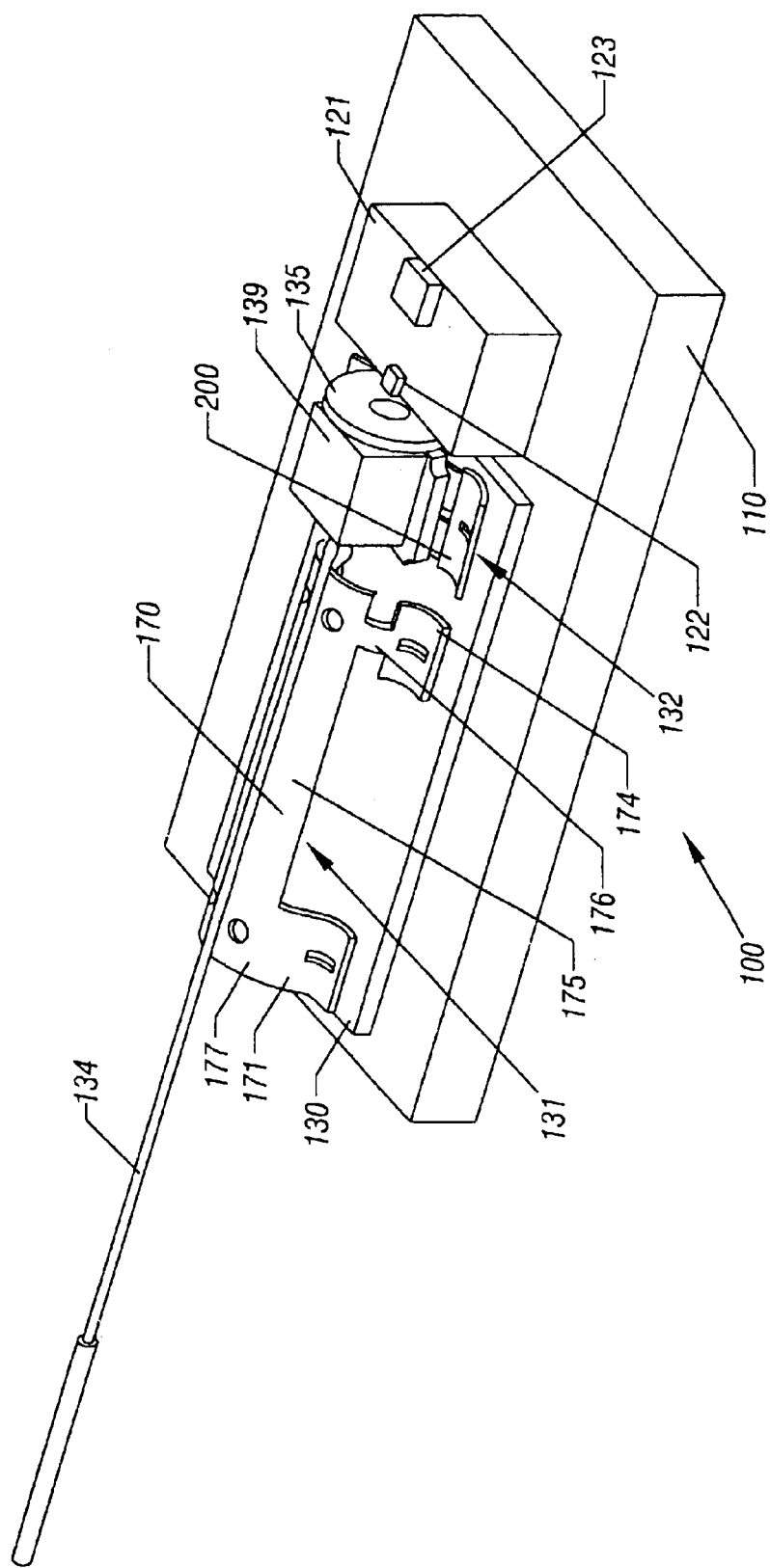
FIG. 1 is a perspective view of one embodiment of an optoelectronic package assembly.

Referring to FIG. 1, an optoelectronic assembly 100 comprises a substrate 110 with a raised platform 121 (e.g., a riser) and a plate 130 (e.g., welding plate, bonding plate) coupled to its top. In one embodiment, the platform 121 and plate 130 are substantially co-planar. The platform 121 and plate 130 may be attached to the substrate 110, for example, by soldering or brazing, or may even be part of the substrate material itself. The platform 121 may be made of a high thermal conductivity material, such as, for example, copper tungsten, aluminum nitride, beryllium oxide, diamond, or boron nitride. A laser diode 122 and a photodiode 123 may be coupled on top of platform 121. The photodiode 123 monitors the light emitted by the back facet of laser diode 122. In another embodiment where optoelectronic assembly 100 is a receiver, photodiode 123 would replace laser diode 122 on platform 121 (and an isolator such as isolator 139 (FIG. 2) would not be necessary).

A pair of flexures assemblies, flexure-assembly 131 and flexure-assembly 132, are coupled to plate 130. An optical fiber 134 is coupled to flexure 170 by, for example, soldering, brazing or welding.

In one embodiment, the flexure 170 comprises four legs, two of which, namely legs 171 and 174, are shown with the other two legs located on the other side of flexure 170, a body (or bridge) 175, and flexing spring regions 176 and 177 on each side of body 175.

Figure 6:
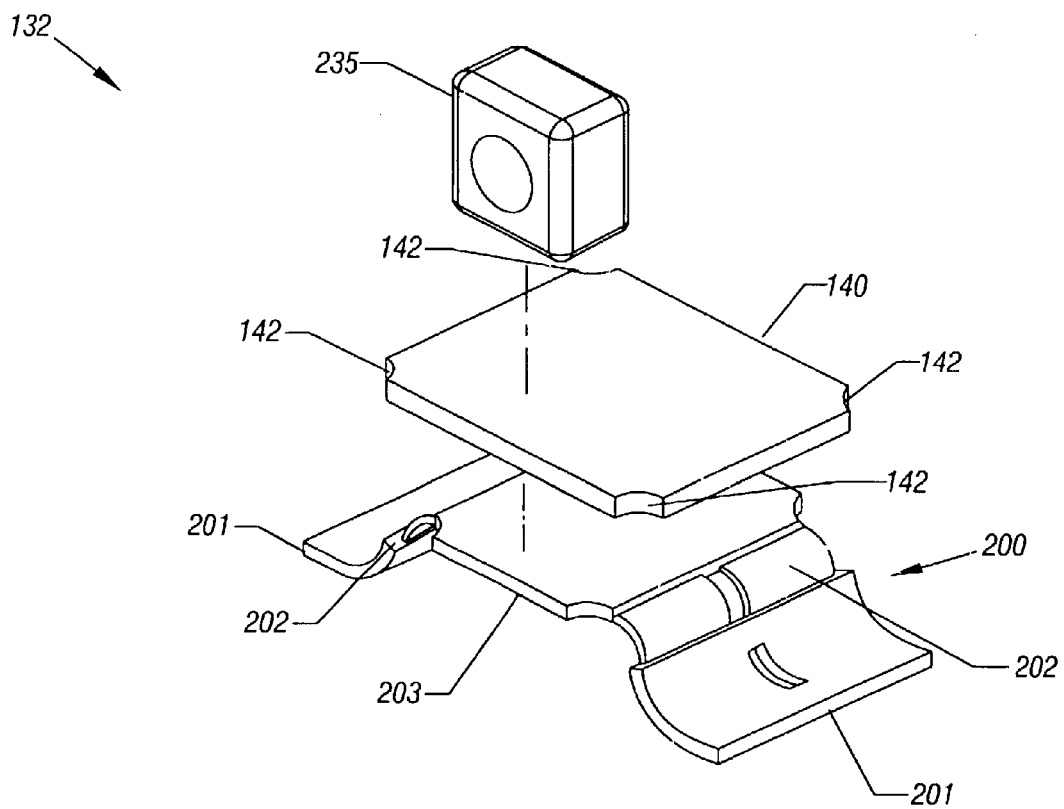
FIG. 6 is an exploded view of the embodiment showed in FIG. 5.

As shown in FIG. 6, flexure 200 comprises two legs 201 joined to the bridge 203 by two flexing spring regions 202.

A base plate 140 is attached to the bridge of flexure 200 by, for example, soldering, brazing or welding.

The base plate 140 can have a plurality of portions 142 defined on the base plate 140 and arranged to be engageable by the grabber tool 301. In one embodiment, the portions 142 may be subtracted corners of the base plate 140. In another embodiment, the portions 142 may be subtracted U-shaped features from the base plate 140. In still another embodiment, the base plate 140 may have vertically oriented portions to be engaged by the grabber tool 301.

An optical assembly can be aligned and attached to the base plate 140 by, for example epoxy, soldering, brazing or welding.

Figure 5:
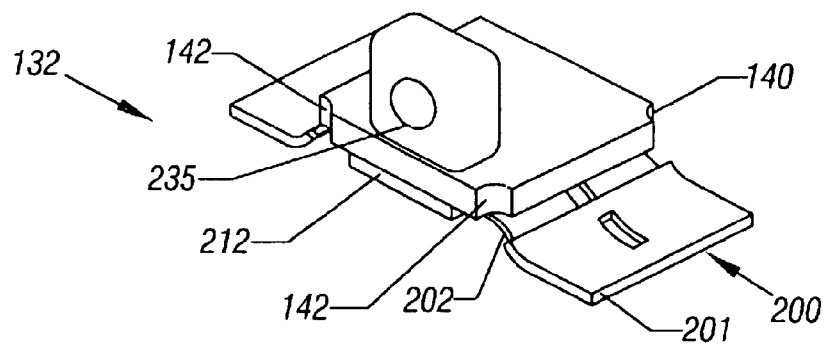
FIG. 5 is a partial perspective view of another embodiment of the present invention.

In some embodiments as shown in FIGS. 5 and 6, the optical component 235 may be an optical lens. In other embodiments as shown in FIGS. 2 and 3 the optical component can be a pre-assembled subassembly comprising a lens 135 and an optical isolator 139.

Figure 2:
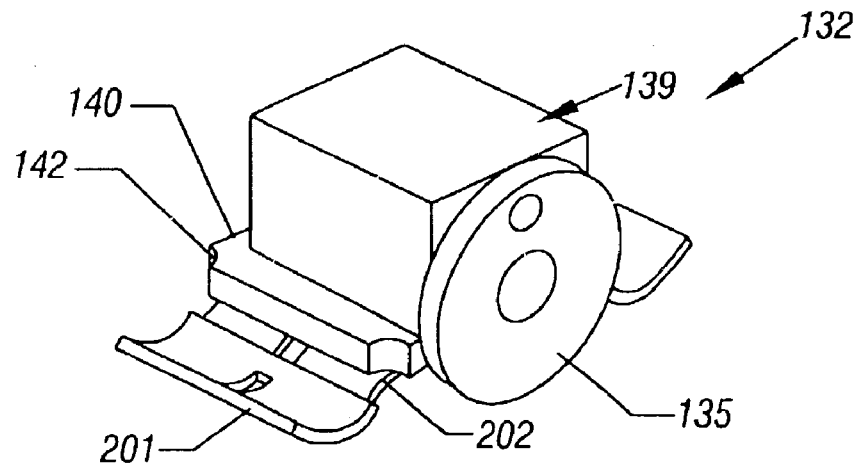
FIG. 2 is a front perspective view of one embodiment of the flexure assembly in the package assembly of FIG. 1.
Figure 3:
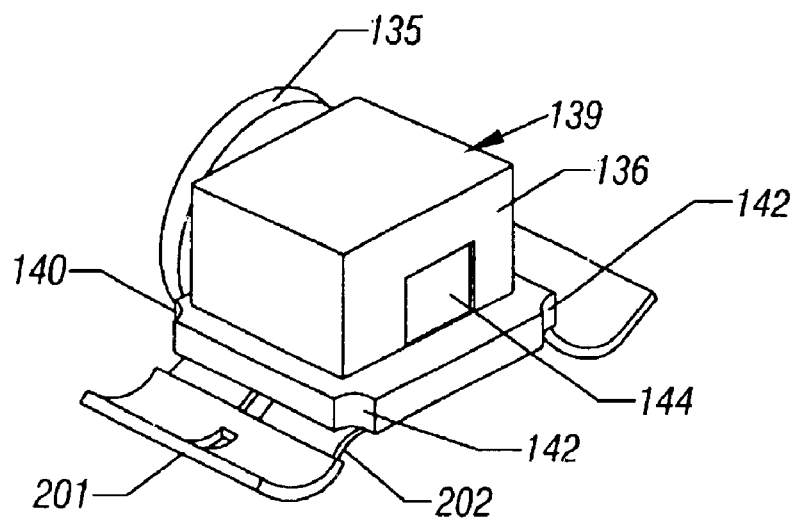
FIG. 3 is a rear perspective view of the embodiment shown in FIG. 2.

The optical isolator 139 of FIGS. 2 and 3 is composed of an optical chip 144 and a permanent magnet 136. The lens 135 is attached directly to the permanent magnet 136 of the optical isolator 139.

Others optical element or assemblies can be mounted on the base plate and the previous examples are not to limit the scope of this invention.

As shown in all Figures, the optical element 235 or optical assemblies 135 and 139 are attached to the upper surface of the base plate 140 while the base plate is attached to the first flexure 200 on the lower side of the base plate 140.

The optical fiber 134, lens 135, optical isolator 139, and laser diode 122 are optically aligned along the same optical axis.

In operation, the laser diode 122 emits light that is collected and focused by lens 135 into the core of optical fiber 134. Other optical elements may be used, including other edge or surface emitting optoelectronic elements. In another alternative embodiment, the package includes a receiver with an optical receiving device (e.g., a photodetector) mounted on platform 121.

Figure 4:
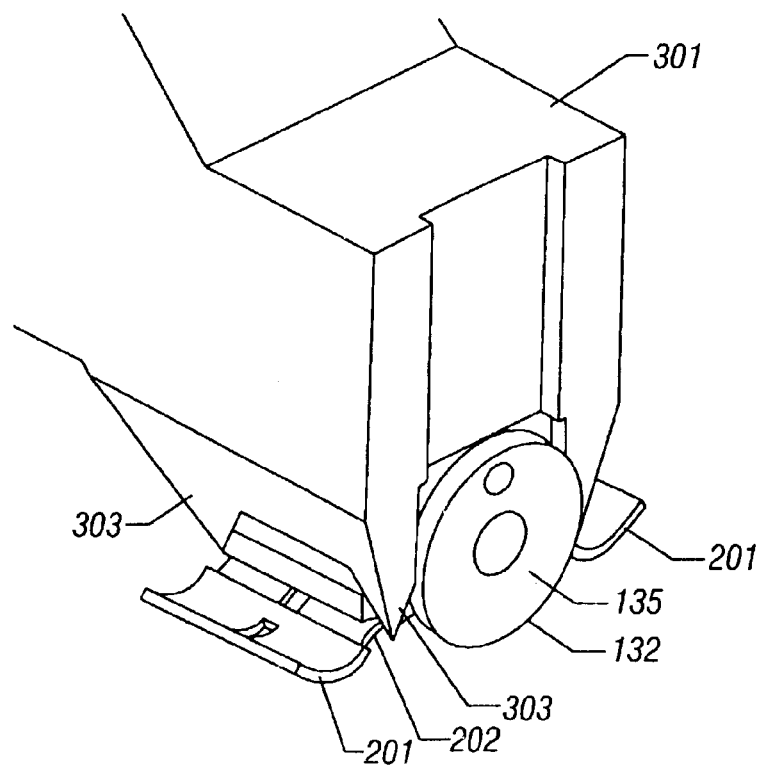
FIG. 4 is a partial perspective view of one embodiment of a manufacturing tool positioning the flexure assembly of FIG. 2.

FIG. 4 illustrates a grabber tool 301 that is used to place assembly 132 onto the plate 130 for attachment. The alignment process for aligning the optical fiber 134, lens 135 (and isolator 139) and laser diode 122 begins by first assembling the optical assembly by attaching lens 135 and isolator 139 together. The base plate is mated to the bridge of flexure 200 by a process such as, for instance, soldering, brazing or welding. Then the optical assembly is mated with the base-plate flexure assembly by, for example soldering or adhesive bonding.

The base plate attachment to the bridge of the flexure as well as the attachment of the optical assembly to the base plate are made from the same direction, enabling the production of assembly 132 by quasi-planar pick and place manufacturing techniques. Furthermore only one alignment is required between the optical axis of the optical assembly and the grabbing features 142, simplifying the manufacturing process and reducing costs.

The flexure 200 and its attached lens 135 and isolator are then picked and dropped in rough alignment on the optoelectronic assembly 100. At this point, flexure assembly 132 simply rests on the plate 130. The laser diode 122 is already attached to platform 121 and defines an optical axis, with respect to which lens/isolator and their optical axis will be aligned using flexure 200. In one embodiment, laser diode 122 is attached on platform 121 before flexure assembly 132 is aligned. In one embodiment, flexure assembly 132 is designed such the optical axis of lens 135 and isolator is higher than optical axis of laser diode 122.

The removable alignment tool 301, shown in FIG. 4, is used to apply pressure to the top of the base plate 140 of flexure assembly 132. The tool 301 includes arms 303 that engage the portions 142 on the base 140. Other tools, designed by one skilled in the art, can provide the ability to temporarily clamp onto the flexure and apply pressure on the bridge. For example, matching sets of grooves in the flexure and the tool can be used.

During the fine alignment step, tool 301 is lowered onto flexure assembly 132 as shown in FIG. 4, thereby applying pressure on flexure 200, causing its flexing spring regions 202 to yield under the pressure. This, in turn, causes the legs 201 of flexure 200 to spread apart and to lower flexure assembly 132 optical axis to align with the axis of the laser diode 122. The tool 301 may also be moved in a plane parallel to the plane of the plate 130, dragging the flexure assembly 132 along with it until lateral and longitudinal alignment of the optical axes of both the laser diode 122 and the lens 135/isolator is achieved. In one embodiment, alignment can be monitored by measuring coupled power at the output of the optical fiber 134 while the laser is powered up and flexure assembly 132 undergoes fine alignment.

Once desired alignment is obtained, the legs 201 of the flexures are attached to plate 130. One attachment process is laser microwelding through the use of a laser, which creates welding spots on the legs of the flexure and potentially plate 130, to attach the flexure legs 201 to the plate 130. Other attachment processes may also be used, such as, for example, UV curable adhesives or soldering. After final attachment of the legs 201 is complete, the tool 301 is raised from the flexure assembly 132, leaving the lens and isolator of flexure assembly 132 aligned with laser diode 122.

The alignment process for aligning optical fiber 134 with the optical axis on which laser diode 122 and lens 135 reside begins by first attaching optical fiber 134 to the body 175 of flexure assembly 131 by a process such as, for instance, soldering or adhesive bonding. Flexure 131 and its attached optical fiber 134 are then picked and dropped in rough alignment on optoelectronic assembly 100. At this point, flexure assembly 131 simply rests on welding plate 130. The laser diode 122 and flexure assembly 132 are already attached to submount and defines an optical axis, with respect to which optical fiber 134 and its optical axis will be aligned using flexure assembly 131.

In one embodiment, the flexure assembly 131 is designed such its optical axis is higher than optical axis of laser diode 122. In one embodiment, the optical axis of the optical fiber is about 100 to 200 microns higher than the optical axis of laser diode when no pressure is applied on flexure assembly 131.

As for flexure assembly 132, A grabber tool (not shown) designed to mate with flexure assembly 131 can then be used to finely align the optical fiber 134 with the optical axis by moving the grabber tool in a plane parallel to the plane of the plate 130, dragging the flexure assembly 131 along with it until lateral and longitudinal alignment of the fiber is achieved. Similarly the grabber tool presses flexure 170 to align the fiber height with the optical axis. The flexure feet 171 and 174 are then attached to plate 130 by laser microwelding or other bonding mechanisms such as, for example, UV curable adhesives or soldering. After final attachment of the legs 171 and 174 is complete, the tool is raised from the flexure assembly 131, leaving the fiber of flexure assembly 131 aligned with the optical axis made by laser diode 122 and lens 135.

Note that although embodiments of optoelectronic packages are described herein having one or more optical elements on plates, risers, submounts or other types of platforms, it is well within the teaching of the present invention to position such components on the package floor while having other optical elements of the package mounted below the top surface of the package floor.

Although the detailed description contains many specifics for the purposes of illustration, one of ordinary skill in the art will appreciate that many variations and alterations to the following details are within the scope of the invention.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An optoelectronic package comprising:
   a first flexure including a bridge, a plurality of legs and flexing spring regions, said bridge coupled to said legs via said flexing spring regions;
   a base plate attached to said bridge of said first flexure; and
   a plurality of optical elements coupled to said base plate.

2. The package in claim 1, said base plate having a plurality of portions defined on said base plate and arranged to be engageable by a grabber tool.

3. The package in claim 2 wherein said plurality of portions defined on said base plate and arranged to be engageable by a grabber tool are subtracted comets from said base plate.

4. The package in claim 2 wherein said plurality of portions defined on said base plate and arranged to be engageable by a grabber tool are subtracted unshaped feature from said base plate.

5. The package in claim 2 wherein said base plate has vertically oriented portions to be engaged by a grabber tool.

6. The package in claim 1 wherein the plurality of optical components are mounted on a side of said base plate opposite to a side where said base plate is attached to said first flexure.

7. The package in claim 6 wherein one of said optical components is an optical lens.

8. The package in claim 6 wherein one of said optical components is an optical isolator.

9. The package in claim 6 wherein said optical components include a preassembled subassembly comprising a lens and an optical isolator.

10. A method comprising:
    providing an optoelectronic package including a first flexure having a bridge attached to a base plate and a plurality of graspable portions on said base plate; and engaging said plurality of portions on said base plate with a grabber tool.

11. The method of claim 10 wherein engaging a plurality of portions includes engaging a vertically oriented portion.

12. The method of claim 10 wherein engaging a plurality of portions includes engaging a subtracted U-shaped feature on said base plate.

13. The method of claim 10 wherein providing an optoelectronic package includes providing a package with an optical lens.

14. The method of claim 10 including providing an optoelectronic package with an optical isolator.

15. The method of claim 10 including providing an optoelectronic package including a preassembled subassembly including a lens and optical isolator.

16. An optoelectronic package comprising:
   a flexure including a bridge, a plurality of legs and flexing spring regions;
   a base plate attached to said bridge; and
   a plurality of grabber portions on said base plate arranged to be engageable by a grabber tool.

17. The package of claim 16 including a plurality of optical elements coupled to said base plate.

18. The package of claim 16 wherein said bridge is coupled to said legs via said flexing spring regions.

19. The package of claim 16 wherein said portions are subtracted corners from said base plate.

20. The package of claim 16 wherein said portions are subtracted U-shaped features from said base plate.

21. The package of claim 16 wherein said portions are vertically oriented.

22. The package of claim 16 including a plurality of optical components mounted on a side of said base plate opposite the side where said base plate is attached to said flexure.

* * * * *

UNITED STATES PATENT AND TRADEMARK OFFICE
CERTIFICATE OF CORRECTION

PATENT NO. : 6,747,819 B1
DATED : June 8, 2004
INVENTOR(S) : Eric Zbinden and Sylvain Colin It is certified that error appears in the above-identified patent and that said Letters Patent is hereby corrected as shown below:

Column 4,
Line 45, "comets" should be -- corners --;
Line 49, "ushaped" should be -- u-shaped --.

Signed and Sealed this

Ninth Day of November, 2004

JON W. DUDAS
*Director of the United States Patent and Trademark Office*